(12) United States Patent
　　Polakoff et al.

(10) Patent No.: US 12,611,910 B2
(45) Date of Patent: Apr. 28, 2026

(54) EXHAUST SYSTEM FOR USE IN KITCHEN APPLICATIONS

(71) Applicant: North American Kitchen Solutions, Incorporated, Elyria, OH (US)

(72) Inventors: Sacha Polakoff, Westlake, OH (US); David Allen Terifay, Statesville, NC (US)

(73) Assignee: North American Kitchen Solutions, Incorporated, Elyria, OH (US)

( * ) Notice: Subject to any disclaimer, the term of this patent is extended or adjusted under 35 U.S.C. 154(b) by 474 days.

(21) Appl. No.: 18/351,141

(22) Filed: Jul. 12, 2023

(65) Prior Publication Data

US 2025/0018765 A1　Jan. 16, 2025

(51) Int. Cl.
*B60H 1/00* (2006.01)
*B60P 3/025* (2006.01)

(52) U.S. Cl.
CPC ........ *B60H 1/00457* (2013.01); *B60P 3/0257* (2013.01)

(58) Field of Classification Search
CPC ............................ B60H 1/00457; B60P 3/0257
USPC ...................................................... 126/299 R
See application file for complete search history.

(56) References Cited

U.S. PATENT DOCUMENTS

| | | | |
|---|---|---|---|
| 2,049,856 A | 8/1936 | Mueller | |
| 2,886,124 A * | 5/1959 | Scharmer | F24C 15/20 |
| | | | 454/67 |
| 3,087,412 A | 4/1963 | Holmes | |
| 4,445,426 A | 5/1984 | Bohanon | |
| 4,601,509 A | 7/1986 | Ellis | |
| 5,890,484 A * | 4/1999 | Yamada | F24F 7/06 |
| | | | 454/67 |
| 6,716,265 B2 | 4/2004 | Hung | |
| 7,128,643 B2 | 10/2006 | Beliveau | |
| 7,556,663 B2 | 7/2009 | Niakan | |
| 9,677,571 B2 | 6/2017 | Pfannenberg | |
| 2004/0194623 A1 | 10/2004 | Brownell et al. | |
| 2009/0032011 A1 | 2/2009 | Livchak et al. | |
| 2010/0099349 A1 | 4/2010 | Gohring | |
| 2016/0271553 A1 | 9/2016 | Salpietra | |

(Continued)

FOREIGN PATENT DOCUMENTS

| | | |
|---|---|---|
| CN | 204263999 U | 4/2015 |
| WO | 2012-102462 A2 | 8/2012 |

*Primary Examiner* — Allen R. B. Schult
*Assistant Examiner* — William C Weinert
(74) *Attorney, Agent, or Firm* — Benesch Friedlander Coplan & Aronoff LLP

(57) ABSTRACT

A hood for use in a kitchen includes a hood body that includes an inlet, a chamber, and two outlets and is configured to function as a duct system to guide kitchen effluent to flow into the hood from the inlet, through the chamber, and out of the hood from the two outlets. The hood includes a blower assembly that include a motor and a blower wheel, which includes primary blades configured to pull the kitchen effluent from the inlet into the chamber and secondary blades configured to pull an ambient air flowing through a rear side of the hood adjacent to the motor and into the chamber. The blower assembly is configured to disperse the kitchen effluent and the ambient air radially outward in a direction perpendicular to a center axis of the blower wheel such that the kitchen effluent is expelled away from the motor.

20 Claims, 18 Drawing Sheets

(56)         References Cited

U.S. PATENT DOCUMENTS

| | | |
|---|---|---|
| 2017/0115009 A1 | 4/2017 | Ramphos et al. |
| 2019/0360701 A1 | 11/2019 | Xu |
| 2021/0071879 A1 | 3/2021 | Polakoff et al. |

* cited by examiner

EXHAUST SYSTEM FOR USE IN KITCHEN APPLICATIONS

FIELD

This disclosure is generally directed to an exhaust system, such as a hood assembly, for use in an industrial or commercial setting that provides ventilation of cooking surfaces and areas in a kitchen. More specifically, this disclosure is related to an exhaust system for use in a mobile kitchen such as a food truck.

BACKGROUND

Kitchen hoods are essential for maintaining clean and healthy kitchen environments by removing smoke and pollutants and reducing high air temperatures generated during cooking. Grease effluent produced during cooking can accumulate in the hood and ductwork, which reduces the efficiency of the hood and causes problems for the users. This grease buildup can also create an obstruction that can lead to reduced airflow, which increases the likelihood of fire. This is especially true in industrial settings, such as commercial kitchens, manufacturing plants, and mobile kitchens where significant amounts of grease particles can be generated by cooking or production processes. For mobile kitchens, such as food trucks, these issues are exacerbated by the relatively small internal area where the cooking takes place.

Kitchen hoods in kitchen environments are vented upwards, through the ceiling in the room. This is especially true in mobile kitchen applications, such as food trucks. While ceiling vented kitchen hoods are available for mobile kitchens, it may not be ideal to add a kitchen hood to the roof of the truck, which adds height and weight to the vehicle. It would be preferable to vent the exhaust from cooking operations from the side of the vehicle. However, doing so requires attention to protrusions from the vehicle and prevention of natural elements, such as wind, rain, and debris, from entering the kitchen hood. Therefore, the use of a low-profile kitchen hood incorporating these features would be beneficial.

Therefore, there is a need for more efficient and effective hood systems to maintain clean and healthy kitchen environments, especially mobile kitchen environments.

SUMMARY

A hood for use in a kitchen includes a hood body that includes an inlet, a chamber, and two outlets. The hood body is configured to function as a duct system to guide kitchen effluent to flow into the hood from the inlet, through the chamber, and out of the hood from the two outlets. The hood includes a blower assembly coupled to the hood body. The blower assembly include a motor and a blower wheel. The blower wheel includes primary blades configured to pull the kitchen effluent from the inlet into the chamber. The blower wheel includes secondary blades configured to pull an ambient air flowing through a rear side of the hood adjacent to the motor and into the chamber. The blower assembly is configured to disperse the kitchen effluent and the ambient air radially outward in a direction perpendicular to a center axis of the blower wheel such that the kitchen effluent is expelled away from the motor.

Other elements of the hood include turning vanes disposed in the chamber in a staggered manner to direct the kitchen effluent and the ambient air to exist the chamber from the two outlets. The turning vanes have a curvature configured to gradually change flow directions and increase flow speed. The curvature is about 100 degrees. The turning vanes are disposed on a bottom side of the chamber. A length of the turning vanes is about 70% of a height of the chamber.

Other elements of the hood include a metal mesh disposed at the inlet to reduce noise. A circular curved ring is disposed at the inlet to straighten a flow of the kitchen effluent into the chamber. An external filter system is disposed at the two outlets. The external filter system comprises V-shaped louvers. The external filter system includes a first wire mesh and a second wire mesh that are overlapped one another such that an undulating pattern of the first wire mesh is substantially perpendicular to an undulating pattern of the second wire mesh.

In one embodiment, the hood is configured to be mounted to a side wall of a food truck. In one embodiment the hood is configured to reduce a temperature of the kitchen effluent to about or below 90° F. when it exits the hood at the two outlets.

A mobile kitchen includes a hood that includes a hood body including an inlet, a chamber, and two outlets. The hood body is configured to function as a duct system to guide kitchen effluent to flow into the hood from the inlet, through the chamber, and out of the hood from the two outlets. The hood includes a blower assembly coupled to the hood body. The blower assembly includes a motor and a blower wheel, which includes primary blades configured to pull the kitchen effluent from the inlet into the chamber and secondary blades configured to pull an ambient air flowing through a rear side of the hood adjacent to the motor and into the chamber. The blower assembly is configured to disperse the kitchen effluent and the ambient air radially outward in a direction perpendicular to a center axis of the blower wheel such that the kitchen effluent is expelled away from the motor.

Other elements of the mobile kitchen include turning vanes disposed in the chamber in a staggered manner to direct the kitchen effluent and the ambient air to exist the chamber from the two outlets. The turning vanes have a curvature configured to gradually change flow directions and increase flow speed. The curvature is about 100 degrees. The turning vanes are disposed on a bottom side of the chamber. A length of the turning vanes is about 70% of a height of the chamber.

In one embodiment, the mobile kitchen is configured to be mounted to a side wall of a food truck.

BRIEF DESCRIPTION OF THE DRAWINGS

The accompanying figures, which are incorporated in and constitute a part of the specification, illustrate various example configurations and data, and are used merely to illustrate various example embodiments. In the figures, like elements bear like reference numerals.

DETAILED DESCRIPTION

Kitchen hoods are essential for maintaining clean and healthy kitchen environments by removing smoke and pollutants and reducing high air temperatures generated during cooking. This is especially essential for kitchens in industrial settings, such as commercial kitchens, manufacturing plants, and mobile kitchens such as food trucks. In such environments, significant amounts of grease particles can be generated during cooking or production processes. The grease buildup can create an obstruction that can lead to reduced airflow and increase the likelihood of fire.

To address the need for a more efficient and effective kitchen hood especially for industrial settings, the present disclosure provides a kitchen hood with a hood body functioning as ductwork for grease removal and temperature reduction. In particular, the hood body functioning as ductwork is designed with airflow guiding features to direct and spin airflow, which enables more effective grease removal from the kitchen environment. The hood includes an integrated blower wheel and motor system that provides high-performance suction and air filtering through high air flow velocity. The high suction capacity helps ensure the kitchen environment remains clean and free from smoke and pollutants. Additionally, the airflow guiding features of the hood body can increase the contact between air flowing through the hood and the surface areas of the hood, such that the effluent is cooled more efficiently and further increases the hood's efficiency removing grease.

Figure 1:
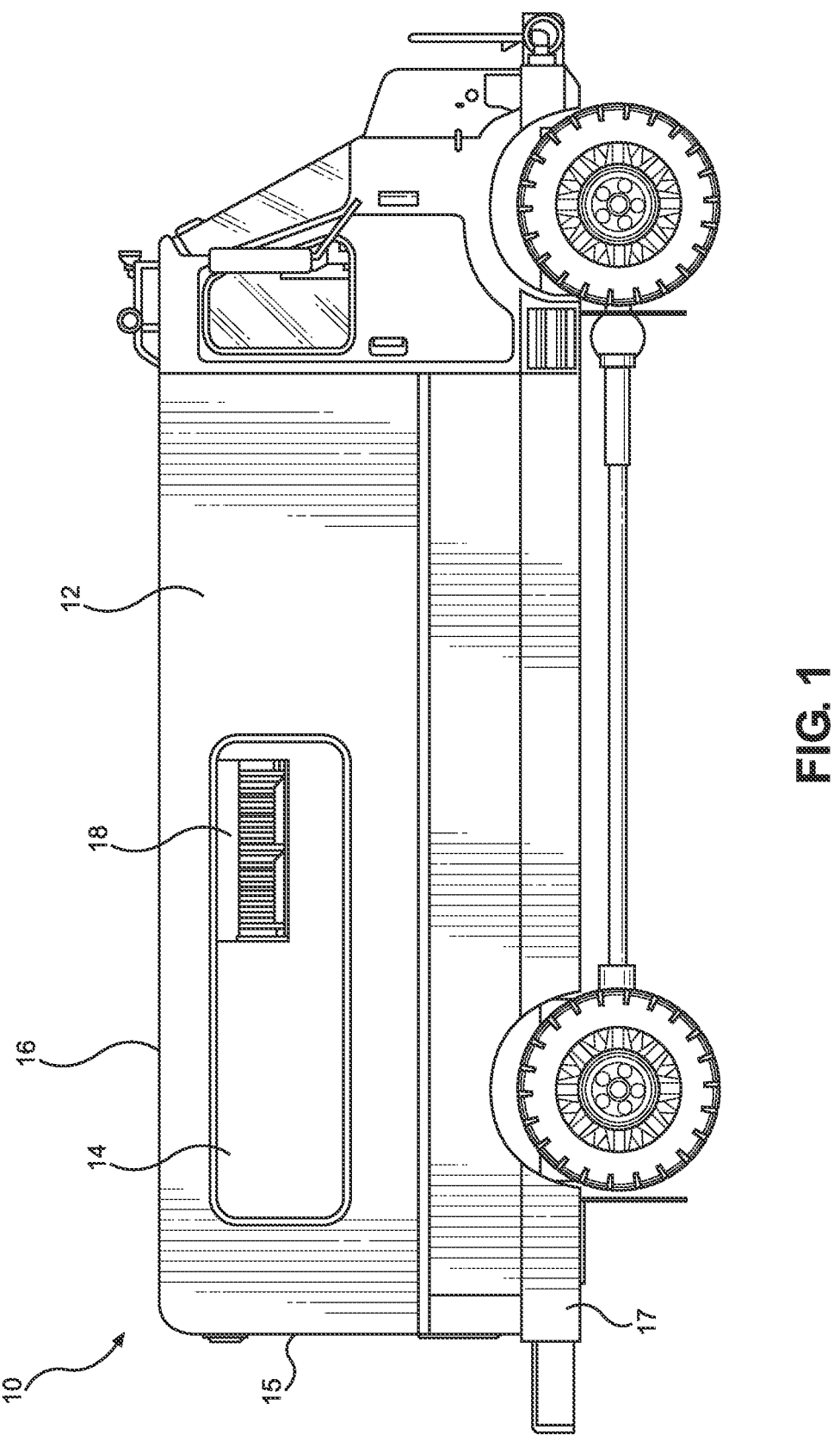
FIG. 1 is a side view of one embodiment of a food truck equipped with the hood of the present disclosure.

Although the kitchen hood disclosed herein is designed for kitchens in industrial settings, it may be used in any kinds of kitchens or cooking surfaces. FIG. 1 illustrates an example of a kitchen hood installed in a food truck Such hoods are generally equipped with an exhaust system, which facilitates ventilation of heat created by the use of a stove, deep fryer, or other cooking surface in a confined space. In most mobile kitchens, the stove or cooking surface is disposed below the hood, with the heat and grease generated by the cooked of food radiates upwardly therefrom. In the illustrated example, different from most mobile kitchens, the kitchen hood disclosed herein allow kitchen exhaust to be ventilated directly through a side wall of a space or structure, such as a small kitchen, without the need for extensive ductwork or an external fan or blower.

Figures 2, 3:
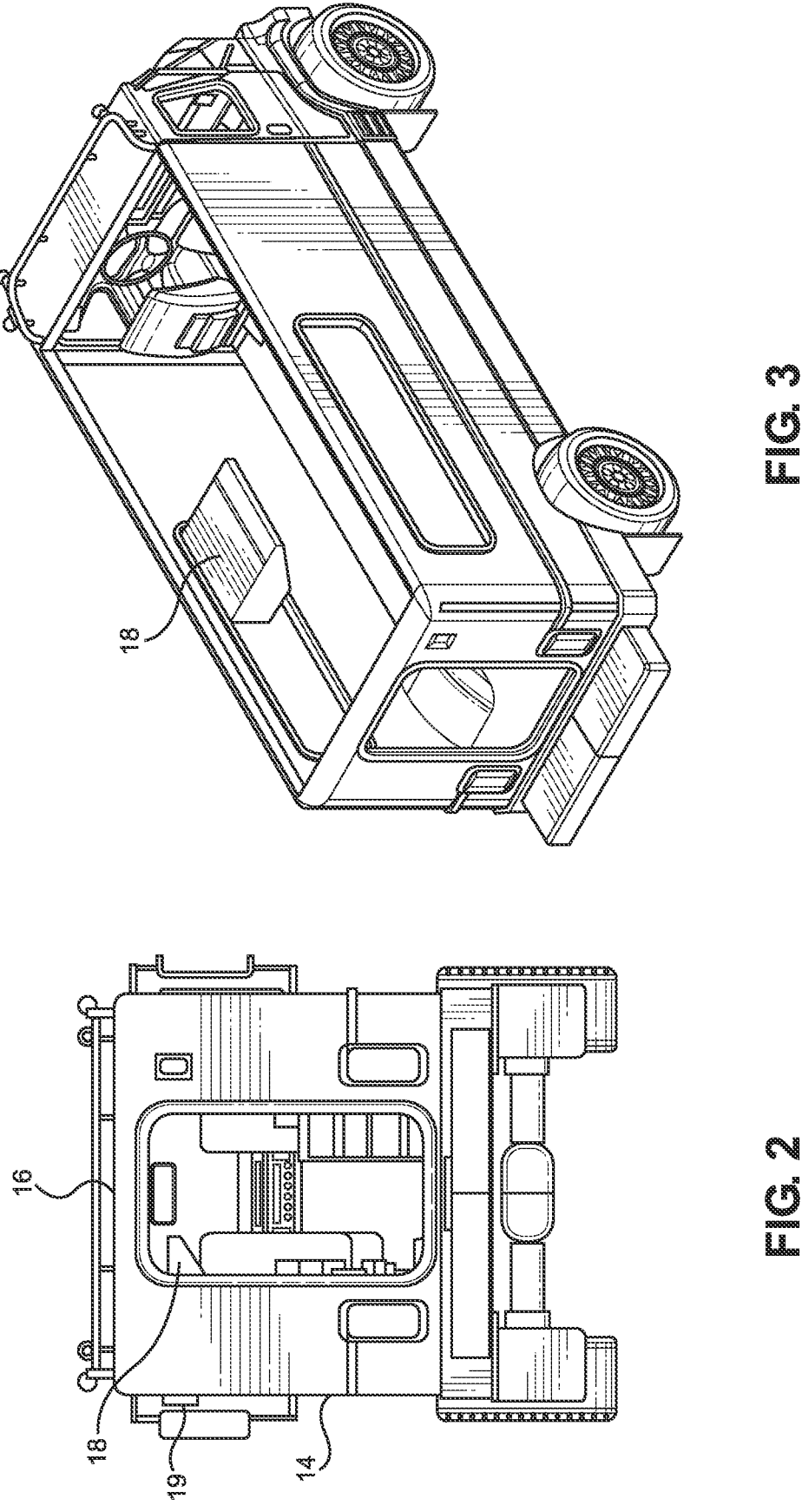
FIG. 2 is a rear view of one embodiment of a food truck equipped with the hood of the present disclosure.
FIG. 3 is an isometric view of one embodiment of a food truck equipped with the hood of the present disclosure.
Figure 4:
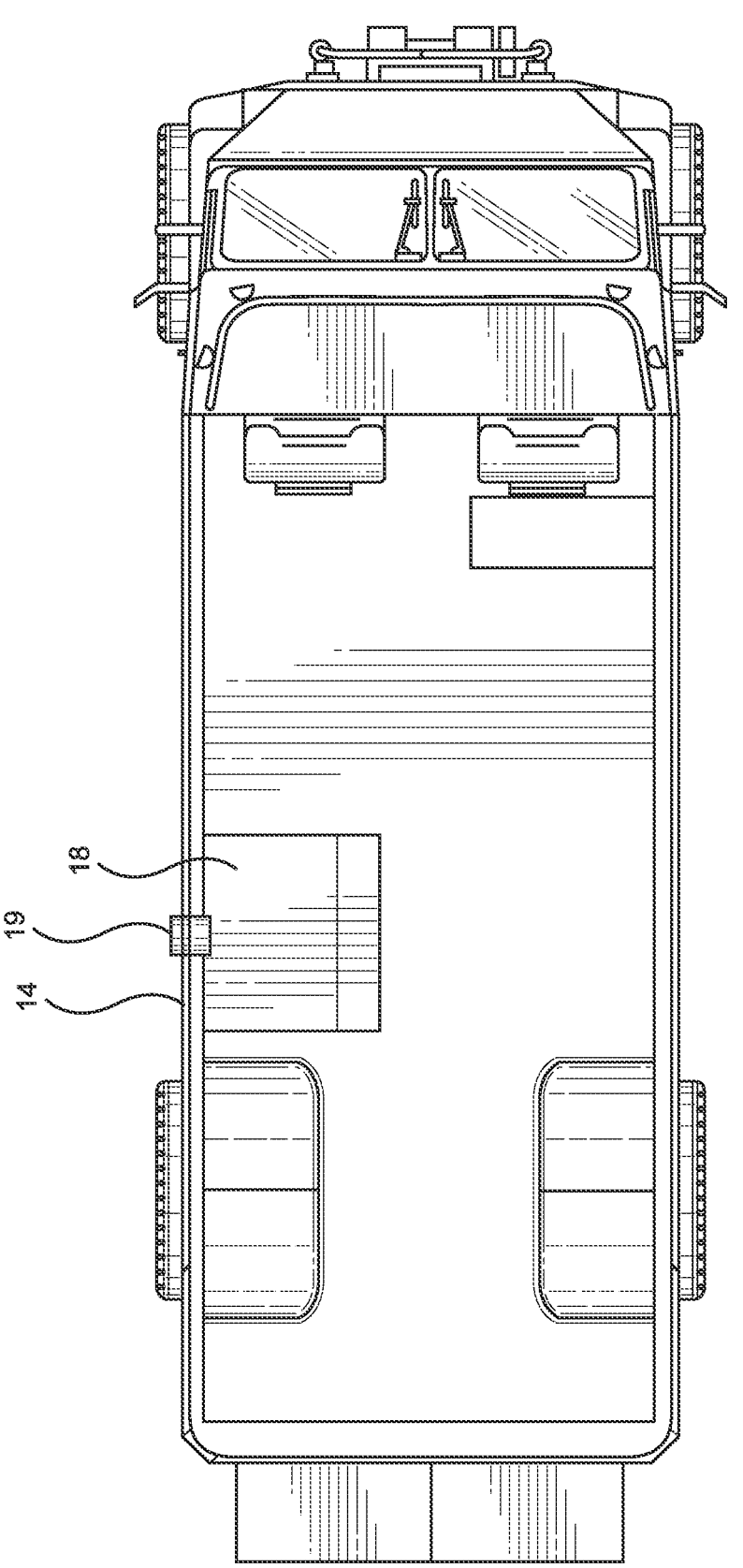
FIG. 4 is a top view of one embodiment of a food truck equipped with the hood of the present disclosure.

As shown in FIG. 1, a food truck 10 generally includes substantially vertical walls (for example a left side wall 12, a right side wall 14, and a back wall 15), a roof 16, and a floor 17. In one embodiment, a ventilation system 18 (hereinafter "a hood") may be mounted to either side wall 12 or 14. By way of example, and as shown in FIGS. 1-3, the hood 18 may be mounted to the right side wall 14. Optionally, the hood 18 may also be secured to the roof 16. In addition, as shown in FIGS. 2 and 4, the hood 18 may be vented directly through the left side wall 14 at an exhaust exit 19.

It should be appreciated that the exact style of the hood 18 may vary, depending on the configuration of the kitchen. However, in one embodiment, the ventilation system 14 may be configured to ventilate air from within the hood 18 through any one or a combination of the substantially vertical walls (the left side wall 12, the right side wall 14, and the back wall 15), the roof 16, and the floor 17 of the food truck 10. For example, in one embodiment, an opening may be created through the left side wall 14 of the food truck 10. In this embodiment, the hood 18 may then be mounted to the left side wall 14 so that the hood 18 covers the opening. The operator of the food truck 10 may then optionally cover the opening on the outside of the truck 10 with a louvered covering (as described below) to prevent rain and other contaminants from entering the kitchen.

Figures 5, 6:
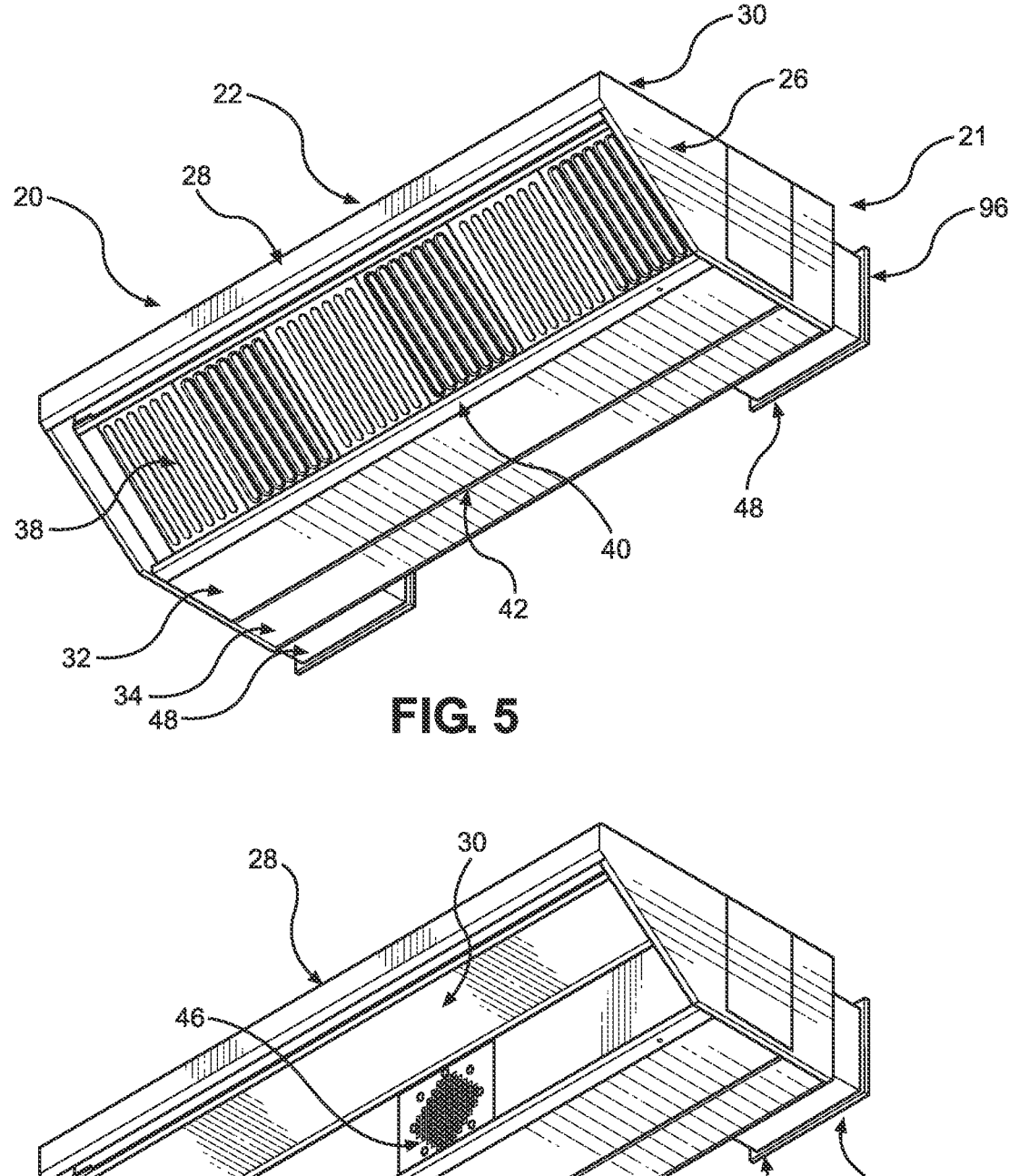
FIG. 5 is a perspective view of one embodiment of the hood of the present disclosure.
FIG. 6 is a perspective view of one embodiment of the hood without baffle filters.
Figure 7:
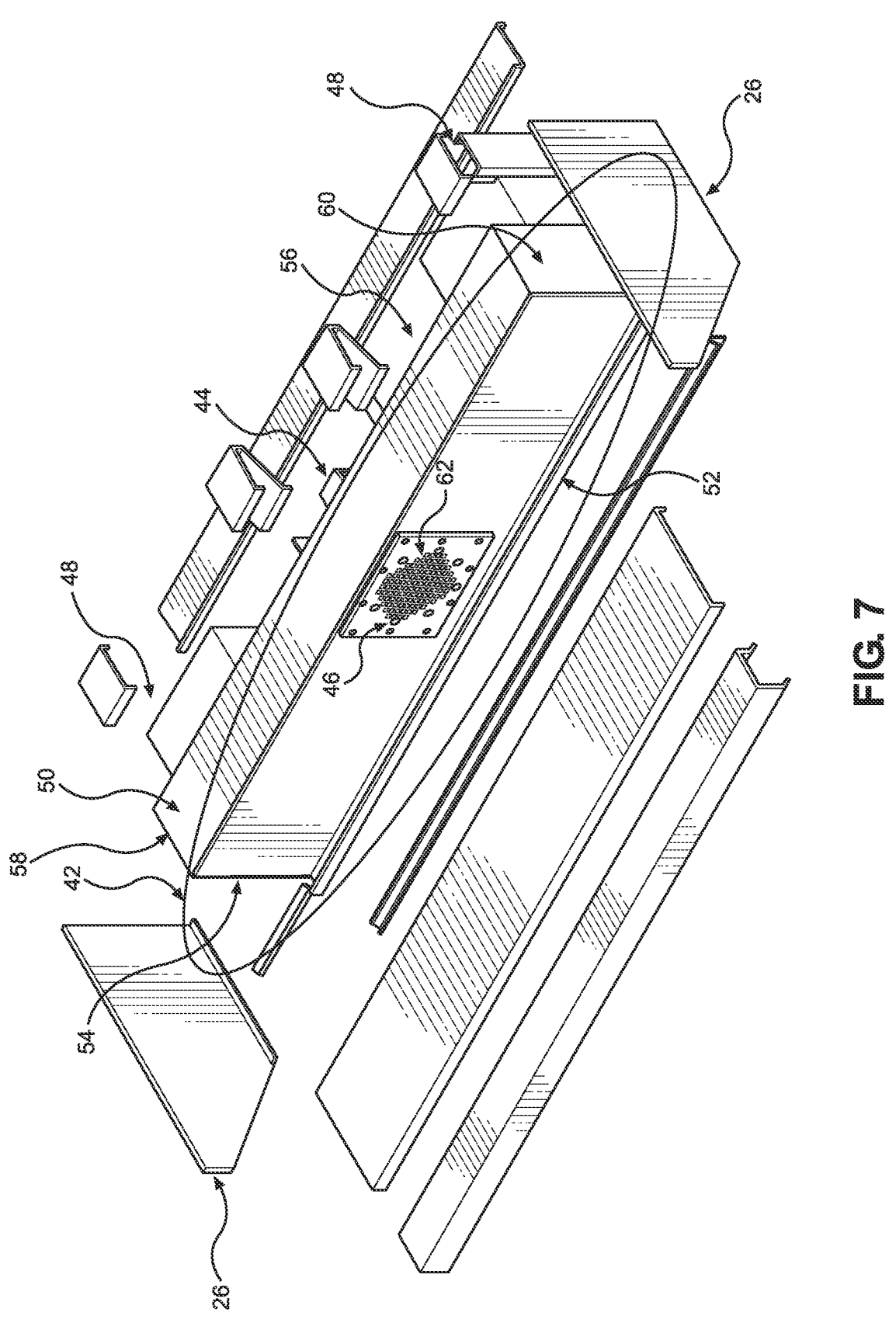
FIG. 7 is an exploded view of one embodiment of a hood body of the hood of the present disclosure.

Now referring to FIGS. 5-7, the hood 18 is oriented with respect to the kitchen effluent that enters the hood 18 from a front side 20 and exits the hood 18 from a rear side 21. The hood 18 includes a hood body 22 that is configured to function as ductwork for grease removal and temperature reduction. In particular, the hood body 22 functions as ductwork to direct and spin airflow, which leads to effective grease effluent removal from the kitchen environment. The hood body 22 is defined by side panels 26, a front panel 28, a top panel 30, a lower panel 32, and an angle panel 34 extending from the rear side to the lower panel 32. These panels (the side panels 26, the front panel 28, the top panel 30, the lower panel 32, and the angle panel 34) are connected to one another to function as ductwork. These panels may be connected to one another using any suitable removably or non-removably mechanism for connecting the components to function as ductwork. For example, these panels may be connected via an adhesive, wedding, mechanical fastening, snap fit, interference fit, clearance fit, etc. These panels may be made of stainless steel, aluminized or galvanized steel, or other suitable materials.

In an installed hood 18 (e.g., the hood 18 in an installed orientation) the side panels 26 and the front panel 28 are oriented vertically (e.g., vertical in relation to the cooking surface or the floor) and the top panel 30 and the lower panel 32 are oriented horizontally (e.g., horizontal in relation to the cooking surface or the floor). The side panels 26, the front panel 28, the top panel 30, the lower panel 32, and the angle panel 34 are designed with desired dimensions to form an inlet 36 that intakes the kitchen effluent and suitable for the dimensions and/or configuration of the kitchen.

The hood 18 may include grease baffle filters 38 that are movably attached to and cover the inlet 36 and include a grease collection tray 40. The grease baffle filters 38 are configured to filter out the grease in the kitchen effluent and the grease is then collected into the grease collection tray 40. The grease filter baffles 38 may have a smooth surface to prevent the grease from adhering to them. The grease particles are collected on the grease filter baffles 38 and eventually fall into the grease collection tray 40. The grease collection tray 40 can be easily removed and cleaned, making maintenance of the hood 18 easier and less time-consuming.

The hood body 22 includes a chamber 42 coupled to a blower assembly or a fan 44, and the blower assembly 44 and the chamber 42 are configured to work collectively to allow compression of the kitchen effluent to increase the efficiency of the blower assembly 44 to exhaust the kitchen effluent out of the kitchen.

The chamber 42 is generally a right rectangular prism (e.g., two parallel end faces and four lateral faces, each one of which is a rectangle; the faces are perpendicular to each of its bases) in shape and is configured to function as ductwork. In particular, the chamber 42 is configured to enclose the kitchen effluent and direct it from an inlet 46 to two outlets 48. The suction generated by the blower assembly 44 pulls the kitchen effluent from the space enclosed by the hood body 22 in the front side 20 through the inlet 46 into the chamber 42 and exit through the two outlets 48. The chamber 42 includes an upper horizontal side 50, a lower horizontal side 52, front vertical side 54, rear vertical side 56, left vertical side 58, and right vertical side 60. The inlet 46 is disposed on the front vertical side 54 and the blower assembly 44 and the two outlets 48 are disposed on the rear vertical side 56. The blower assembly 44 is relatively at the center of the rear vertical side 56 and the two outlets 48 are on the left and right sides of the blower assembly 44.

Figure 8:
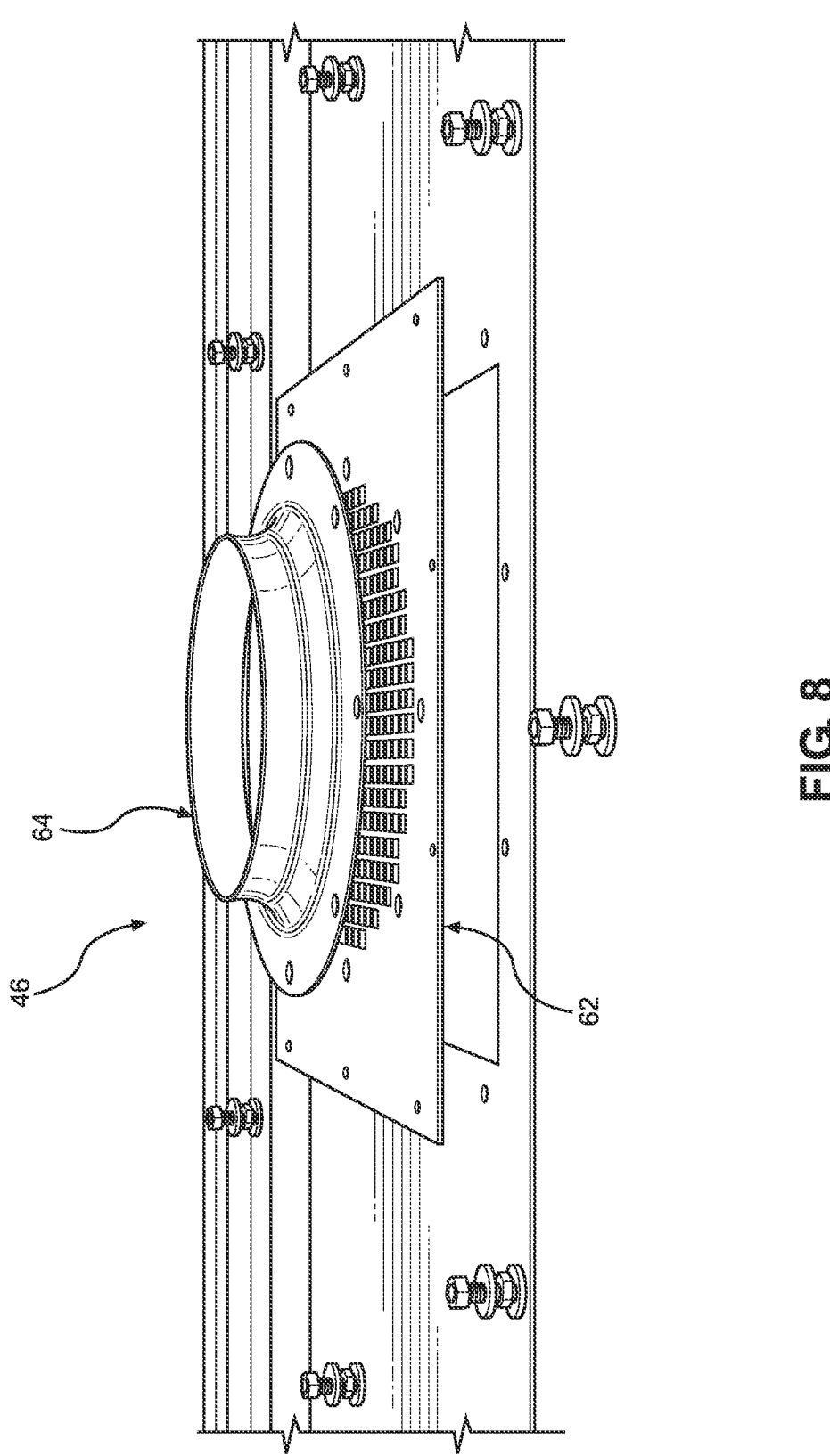
FIG. 8 is a perspective view of one embodiment of an inlet into a hood body.
Figure 9:
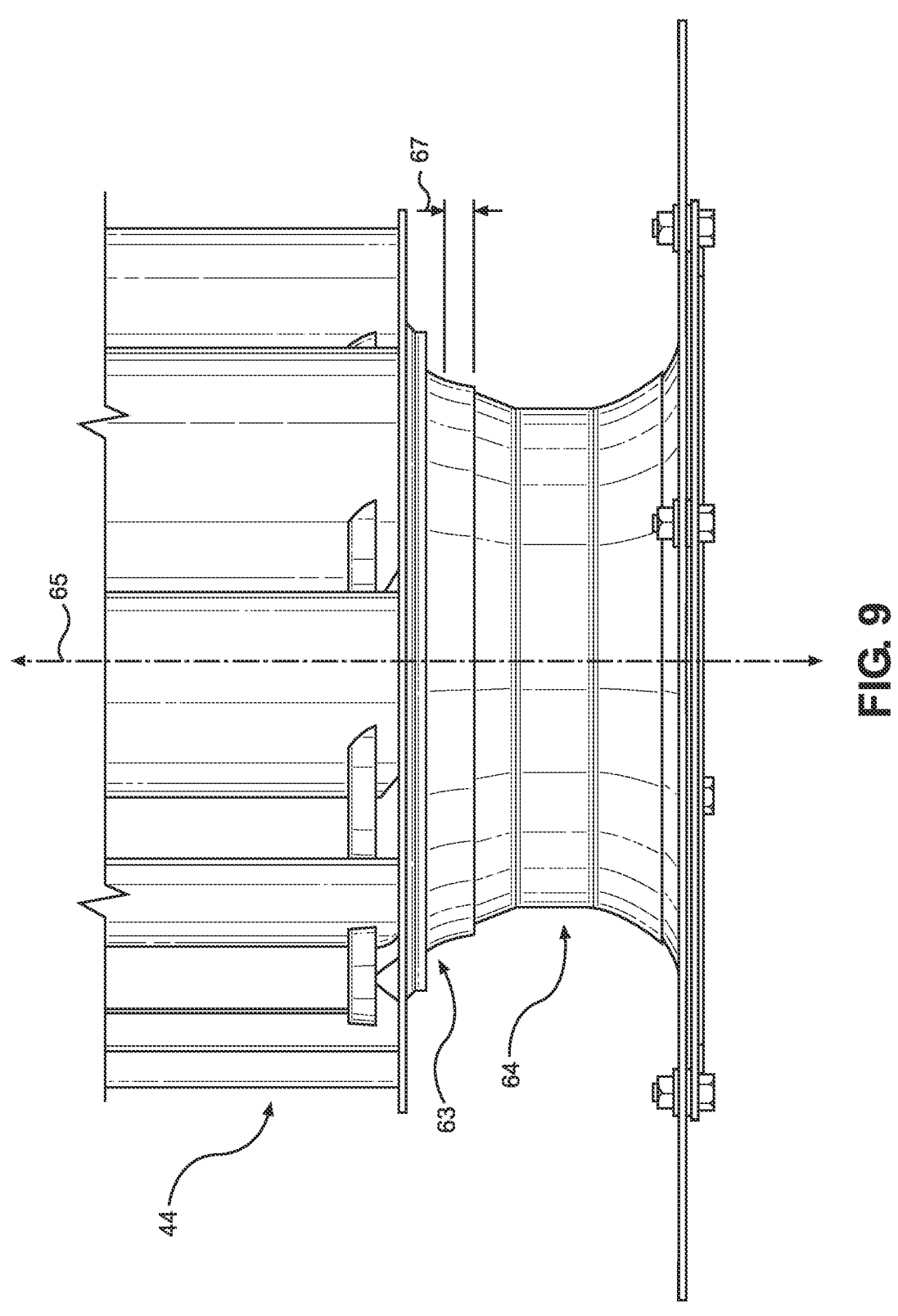
FIG. 9 is a side view of one embodiment of a portion of a hood body.

As shown in FIG. 8 and FIG. 9, the inlet 46 includes a metal mesh 62 and a passage 64. The metal mesh 62 is configured to reduce the nose level and the passage 64 is configured to straighten the kitchen effluent and direct it towards the blower assembly 44. The passage 64 and the blower assembly 44 may be positioned such that the passage 64 overlaps a passage 63 into the blower assembly 44 to allow smooth airflow. As shown in FIG. 9, the passage 63 and the passage 64 overlaps in an axial direction 65. A depth 67 of the overlap may be up to one inch (e.g., about 0.1" to 1.0", about 0.5" to 1.0", about 0.8 to 1.0", etc.).

Figure 10:
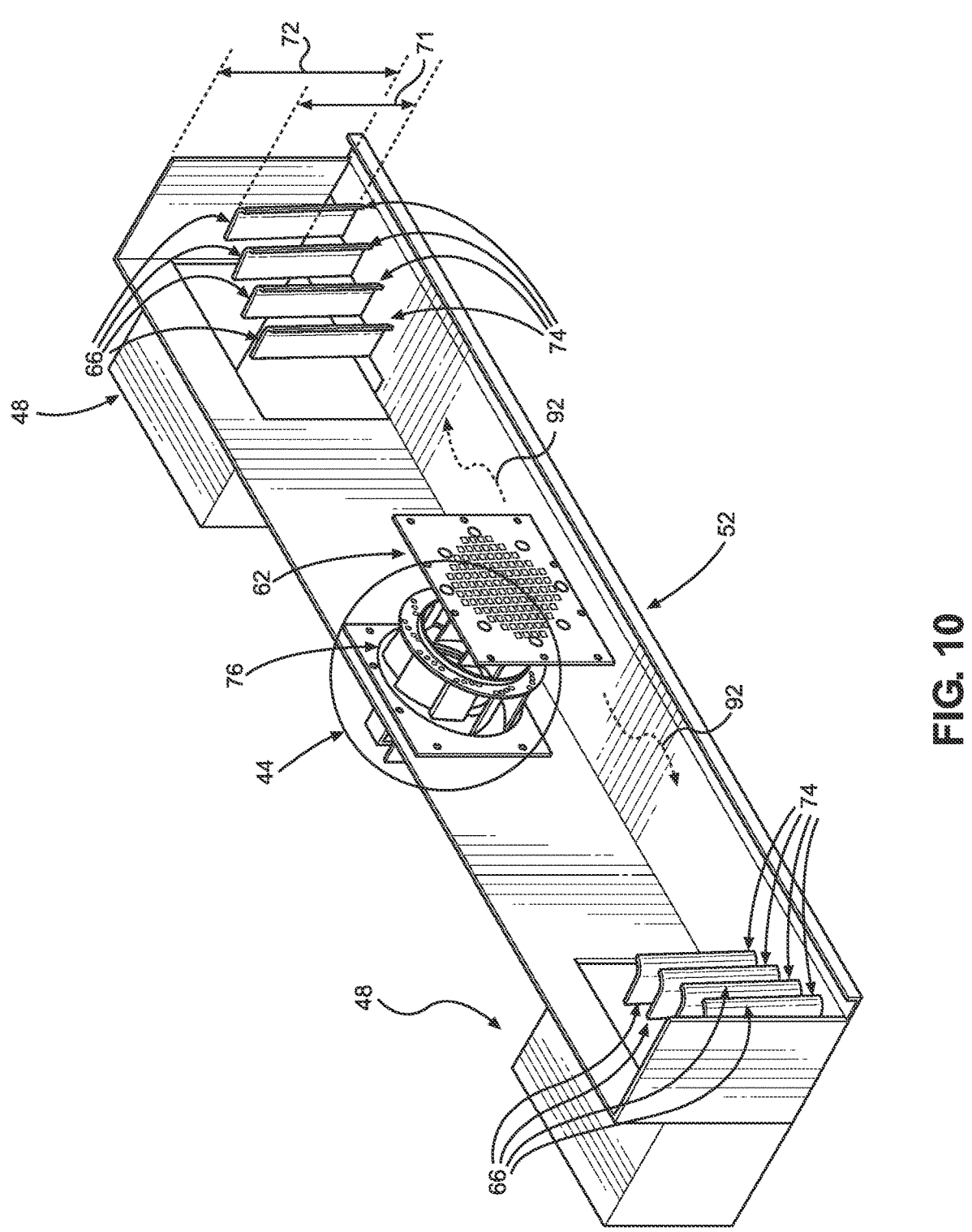
FIG. 10 is a perspective view of one embodiment of a portion of a hood body.
Figure 11:
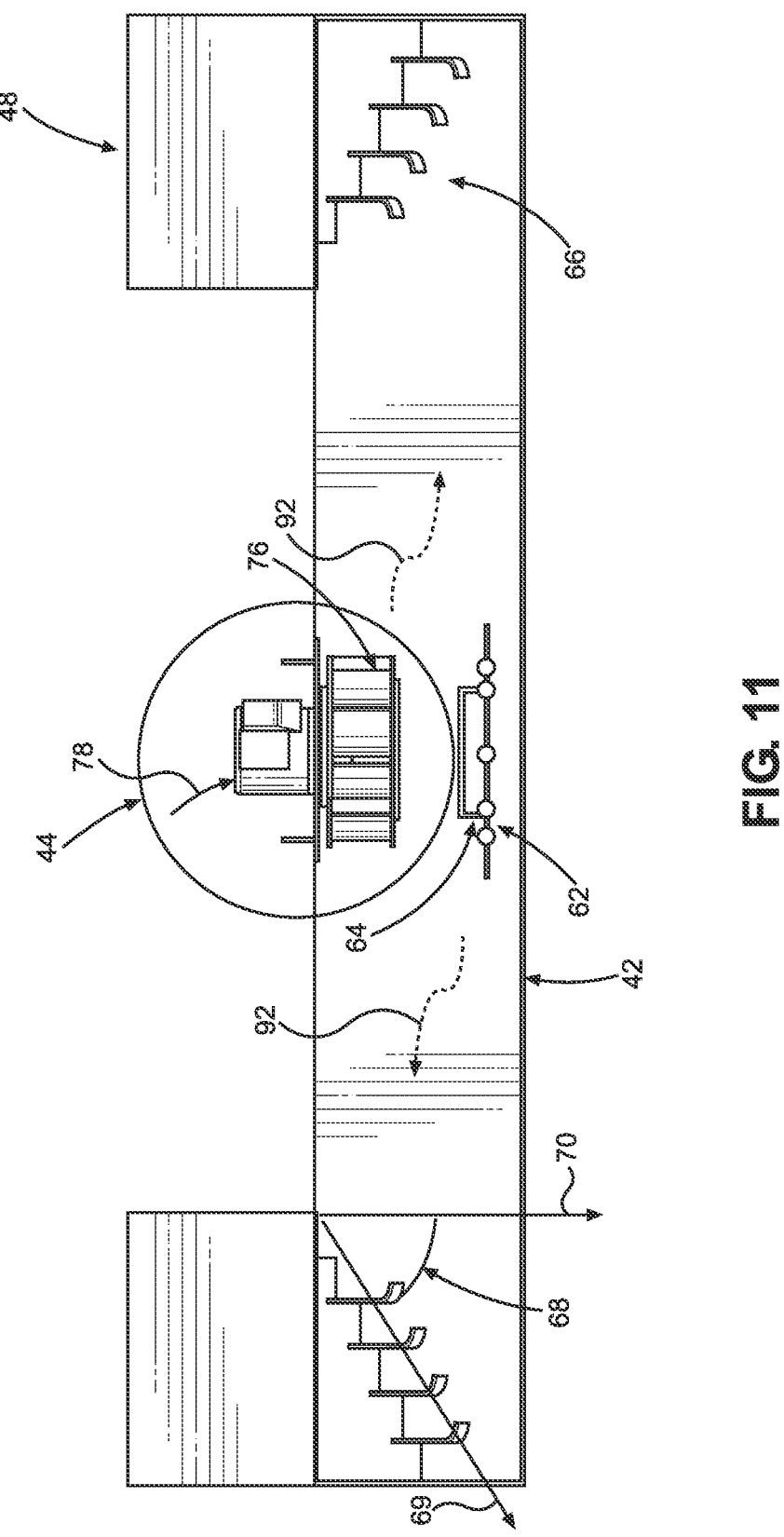
FIG. 11 is a top sectional view of one embodiment of a portion of a hood body.

As shown in FIGS. 10 and 11, the hood body 22 includes turning vanes 66 disposed inside the chamber 42 in front of the two outlets 48. The turning vanes 66 are attached to the lower horizontal side 52 of the chamber 42. The turning vanes 66 are shaped and arranged in any suitable manner to guide the flow of the kitchen effluent and create a smooth natural flow path for the kitchen effluent to exit the chamber 42 through the two outlets 48. For example, the turning vanes 66 are arranged in a staggered manner with an offset angle 68 (e.g., the angle between a staggered axis 69 and an orthogonal axis 70 of the two outlets 48). The offset angle 68 may be about 20-70 degrees, about 30-60 degrees, about 40-50 degrees, or about 45 degrees.

The turning vanes 66 are designed to have an aerodynamically smooth curvature suitable to guide the flow of the kitchen effluent. For example, the turning vanes 66 may have a length 71 relative to a height 72 of the chamber 42, the length 71 may be about 50-100%, about 60-90%, about 80-70%, or about 75% of the height 72. The turning vanes 66 may all have the same length 71 or may have different lengths 71, or the length 71 may increase or decrease in the direction of the staggered axis 69. The turning vanes 66 have a curvature 74 of any suitable degrees, e.g., about 100-160 degrees, about 100-150 degrees, about 100-140 degrees, about 100-130 degrees, about 120 degrees, or about 110 degrees.

Furthermore, the turning vanes 66 are designed to accelerate the airflow speed based on Bernoulli's principles. When airflow encounters the turning vane 66, it divides into two main streams. The stream passing over an outer side of the curve has a longer distance to travel compared to that along an inner side of the curve. Based on Bernoulli's principles, the airflow over the outer side must accelerate to cover the longer distance at the same time as the airflow along the inner side of the curve. This pressure difference between the outer and inner sides creates a net force perpendicular to the airflow, which increases the net airflow.

Figure 12:
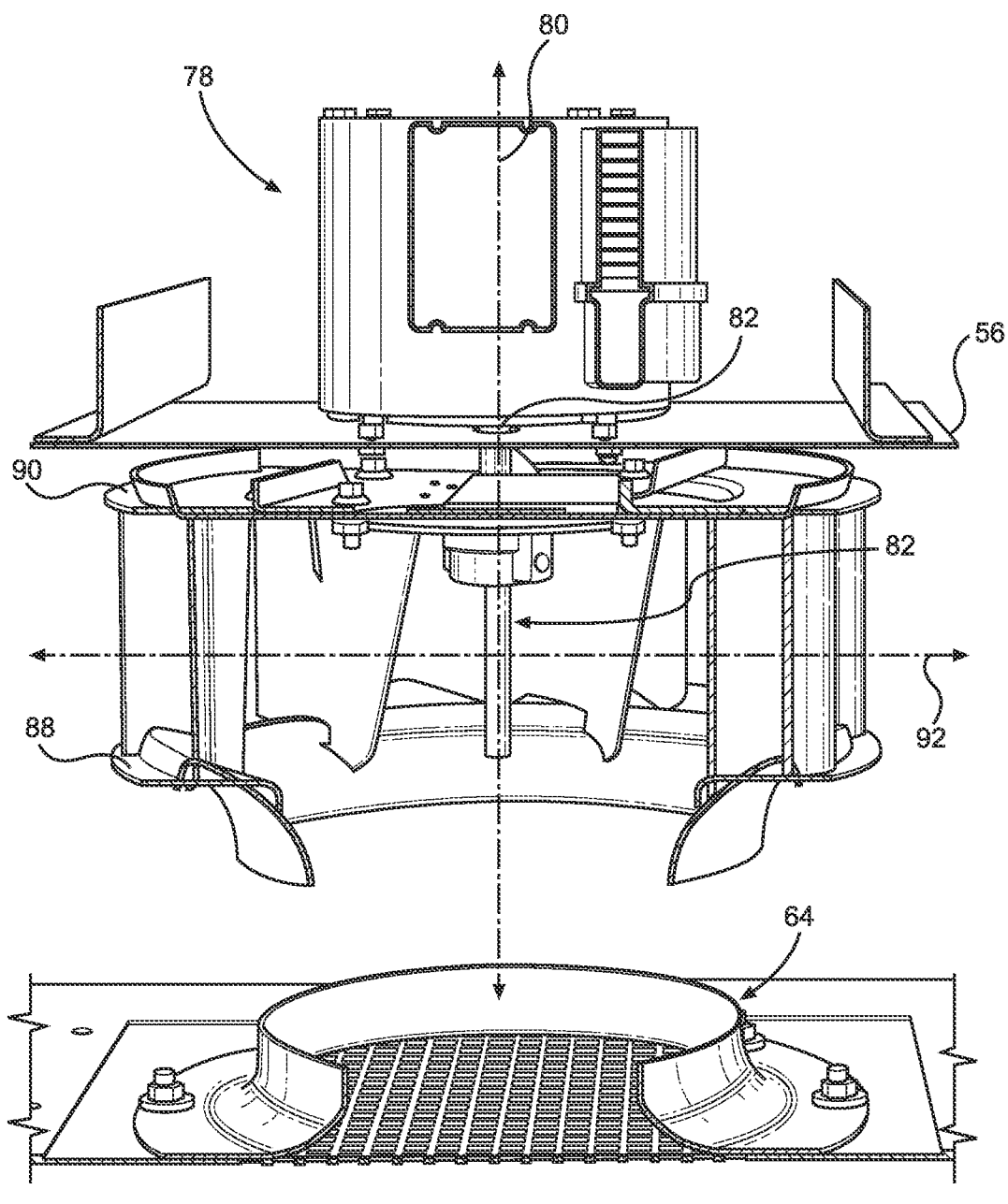
FIG. 12 is a perspective sectional view of one embodiment of a blower assembly of the hood.
Figure 13:
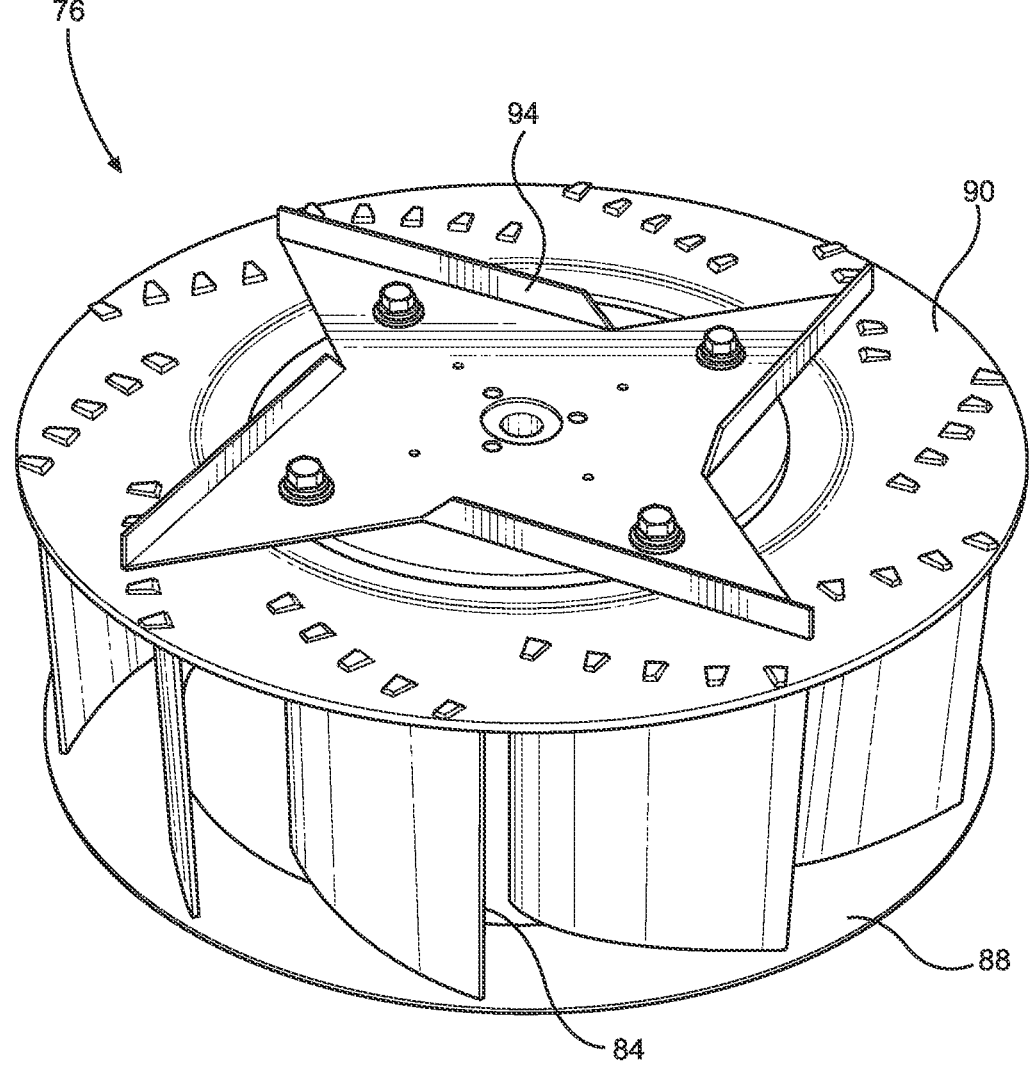
FIG. 13 is a perspective view of one embodiment of a blower wheel of the blower assembly of FIG. 12.

As shown in FIGS. 12-13, the blower assembly 44 includes a blower wheel 76 (e.g., a direct drive type blower wheel) and a motor 78 arranged along a center axis 80 (e.g., along a shaft 82). The blower wheel 76 is disposed inside the chamber 42 adjacent to the rear vertical side 56. The motor 78 is disposed on the opposite end of the blower wheel 76 outside the chamber 42, adjacent to the rear vertical side 56. There is an opening 82 on the rear vertical side 56 of the chamber 42 (the hood body 22) to accommodate the shaft 82 through.

The blower wheel 76 includes primary blades 84 disposed about the shaft 82 between a font side 88 and a rear side 90 of the blower wheel 76. The primary blades 84 are configured to pull the kitchen eluent and disperse it outwardly in a radial direction 92 (e.g., perpendicular to the center axis 80).

The blower wheel 76 further includes secondary blades 94 disposed between the rear side 90 of the blower wheel 76 and the rear vertical side 56 of the chamber 42. The secondary blades 94 maybe mounted on the rear side 90. The secondary blades 94 are configured to pull ambient air from the side of the motor 78 (from outside the hood 18). Once the ambient air enters the chamber 42 it is dispersed outward radially (in the radial direction 92) and joins the kitchen effluent flow. For example, there are two streams of airflow inside the chamber 42. The first stream of airflow (e.g., the kitchen effluent) is mainly driven/dispersed by the primary blades 84, the second stream of airflow is mainly driven/dispersed by the secondary blades 94, the first and second streams of airflow join/mix and exit the two outlets 48.

Figure 14:
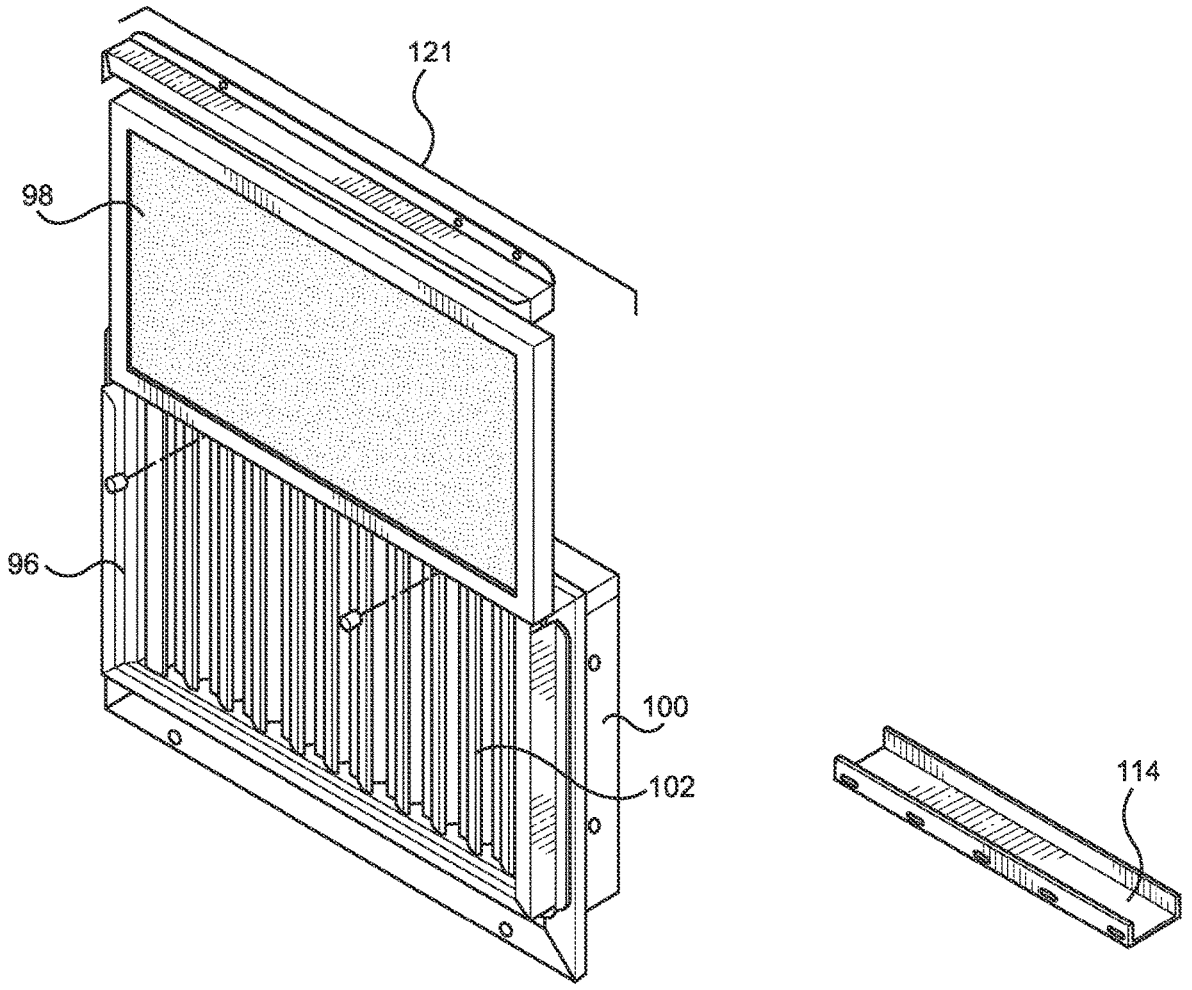
FIG. 14 is an exploded view of one embodiment of an external filter system.
Figure 15:
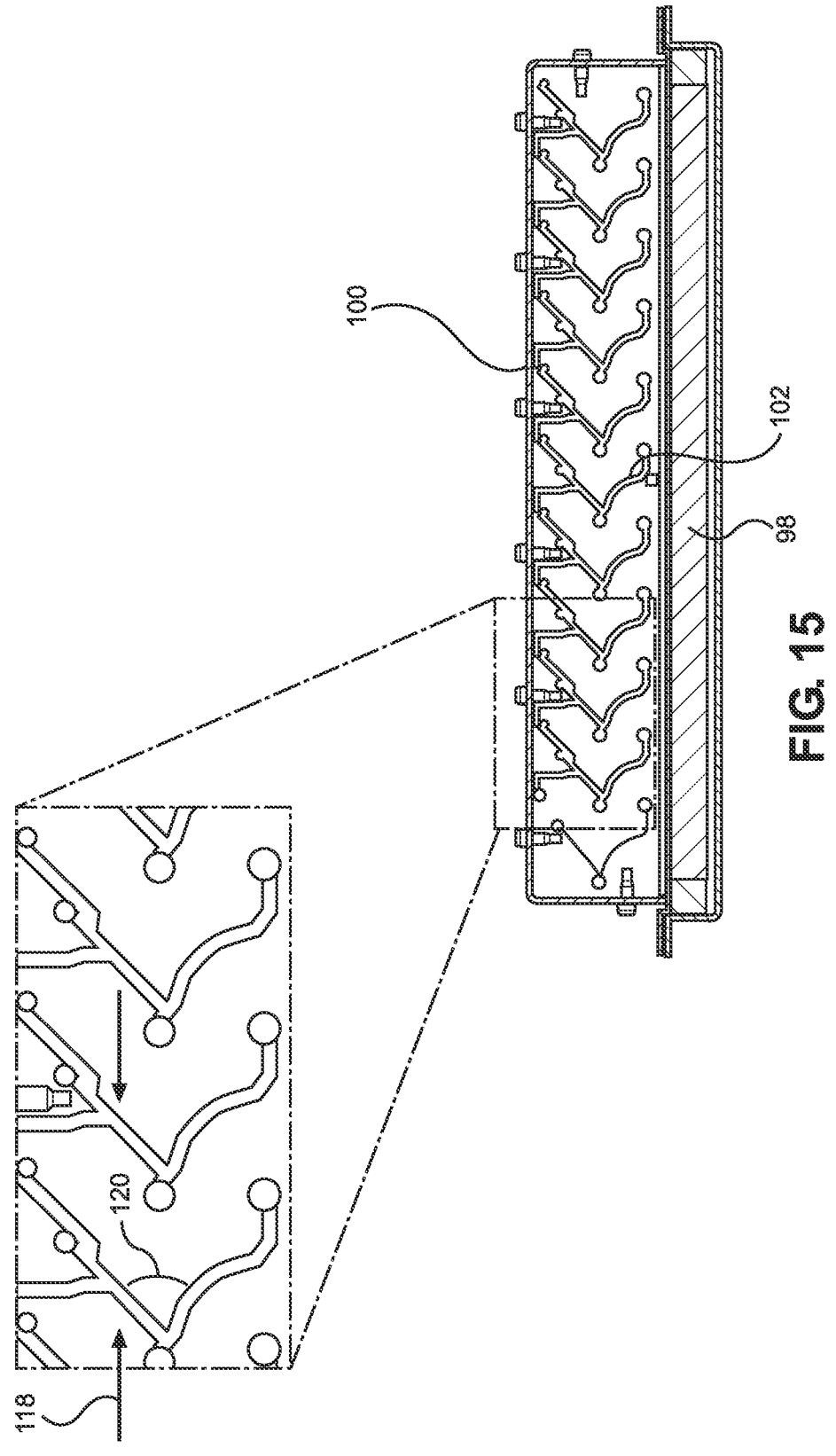
FIG. 15 is a cross-sectional and detail view of an internal set of louvers disposed within one embodiment of an external filter system.

As shown FIGS. 14-15, the hood 18 may include baffle louvers 96 attached to the two outlets 48 (e.g., venting ports of the ductwork). The baffle louvers 96 may generally have a V-shape or curve which further accelerate the airflow (based on Bernoulli's principle) to at least partially compensate the speed loss due to friction flowing through the chamber 42.

The hood 18 may include an external filter 98 configured to break up and smooth the flow of the kitchen effluent. For example, the external filter 98 may be made of 3 layers of opposing meshes which baffle the kitchen effluent and enable the use of the entire louver area of the baffle louvers 96 (as opposed to using only the higher speed area over the baffles). The 3 layers of meshes help more uniformly spreading the airflow across the baffle louvers 96 so it does not overpower one portion of the baffle louvers 96.

The baffle louvers 96 may include a louver frame body 100, a set of V-shaped louvers 102, and the external filter 98 slidably (as shown in FIG. 13) disposed within the louver frame body 100. The external filter 98 may be removed in order to easily clean the filter and remove any grease or particulates that may be built up on the internal surface of the filter. The exact style of the external filter 98 may vary, depending on at least the filtering efficiency requirements.

Figure 16:
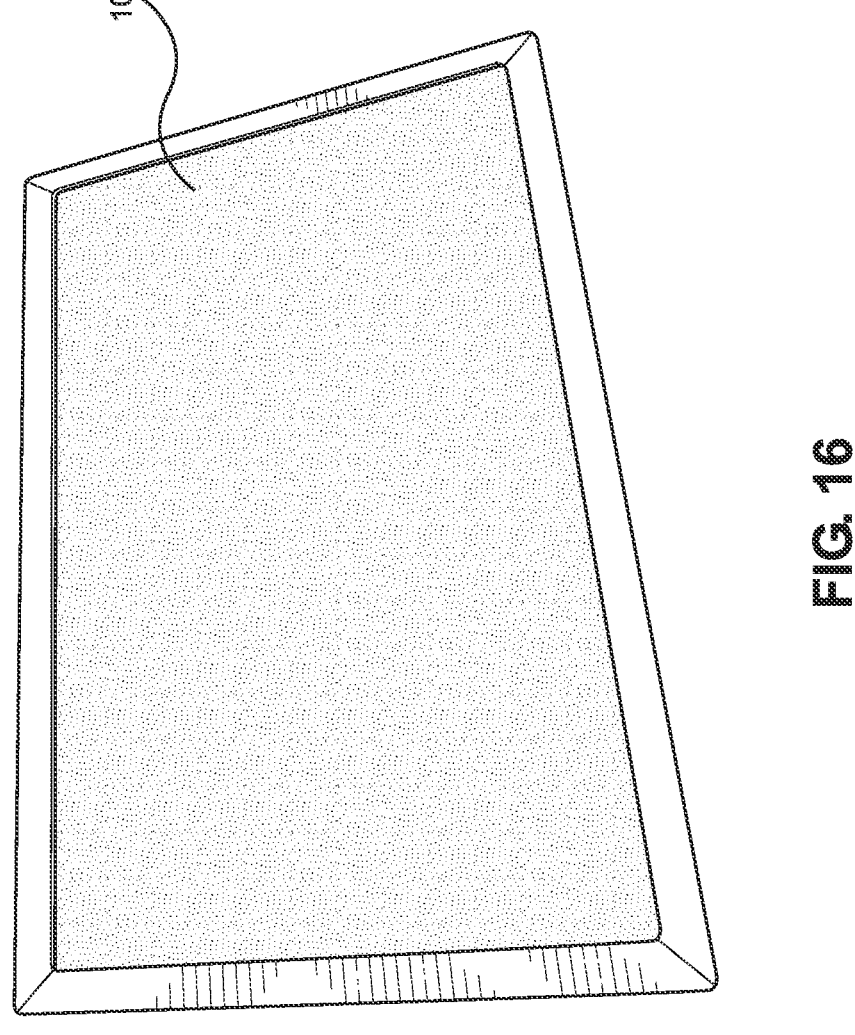
FIG. 16 is an exploded view of one embodiment of an external filter of the external filter system.
Figure 17:
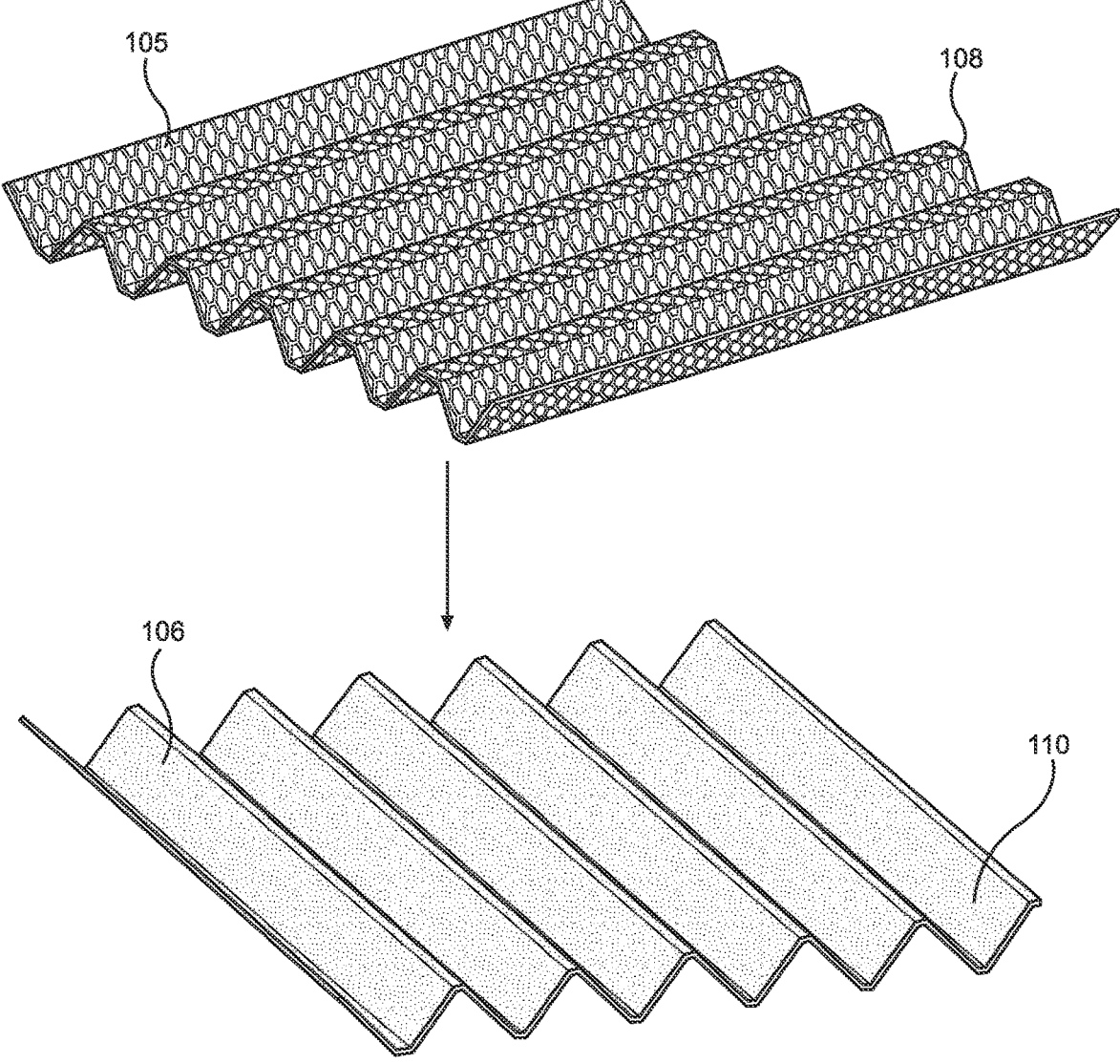
FIG. 17 is an exploded view of one embodiment of overlapping wire meshes of the external filter.
Figures 18, 19:
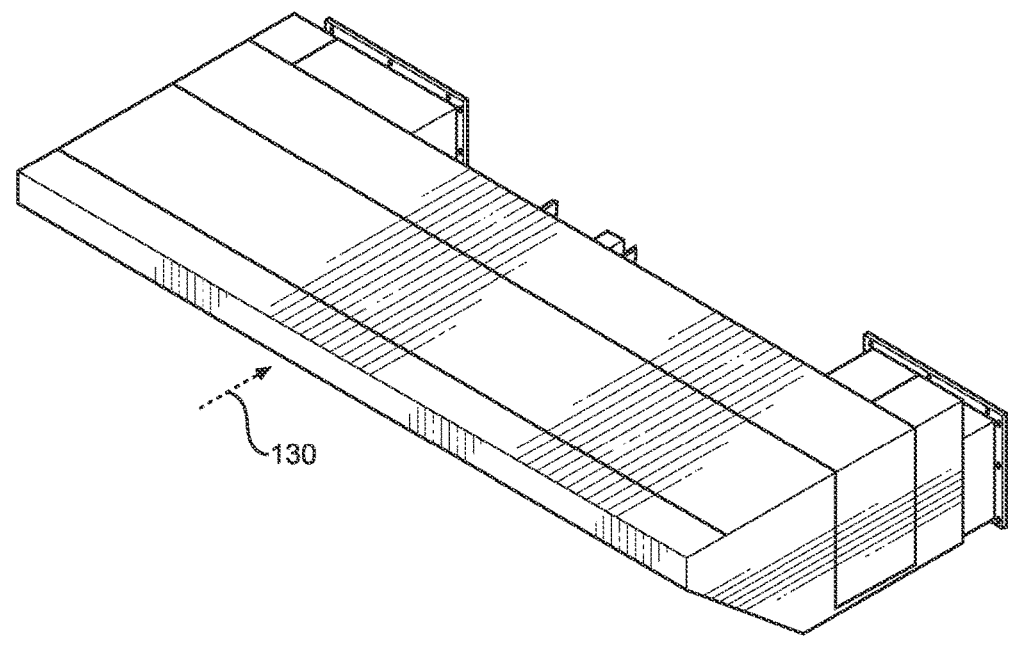
FIGS. 18-21 are different views of one embodiment of a hood illustrating flows of ambient air and kitchen affluent into and out from the hood.
Figure 20:
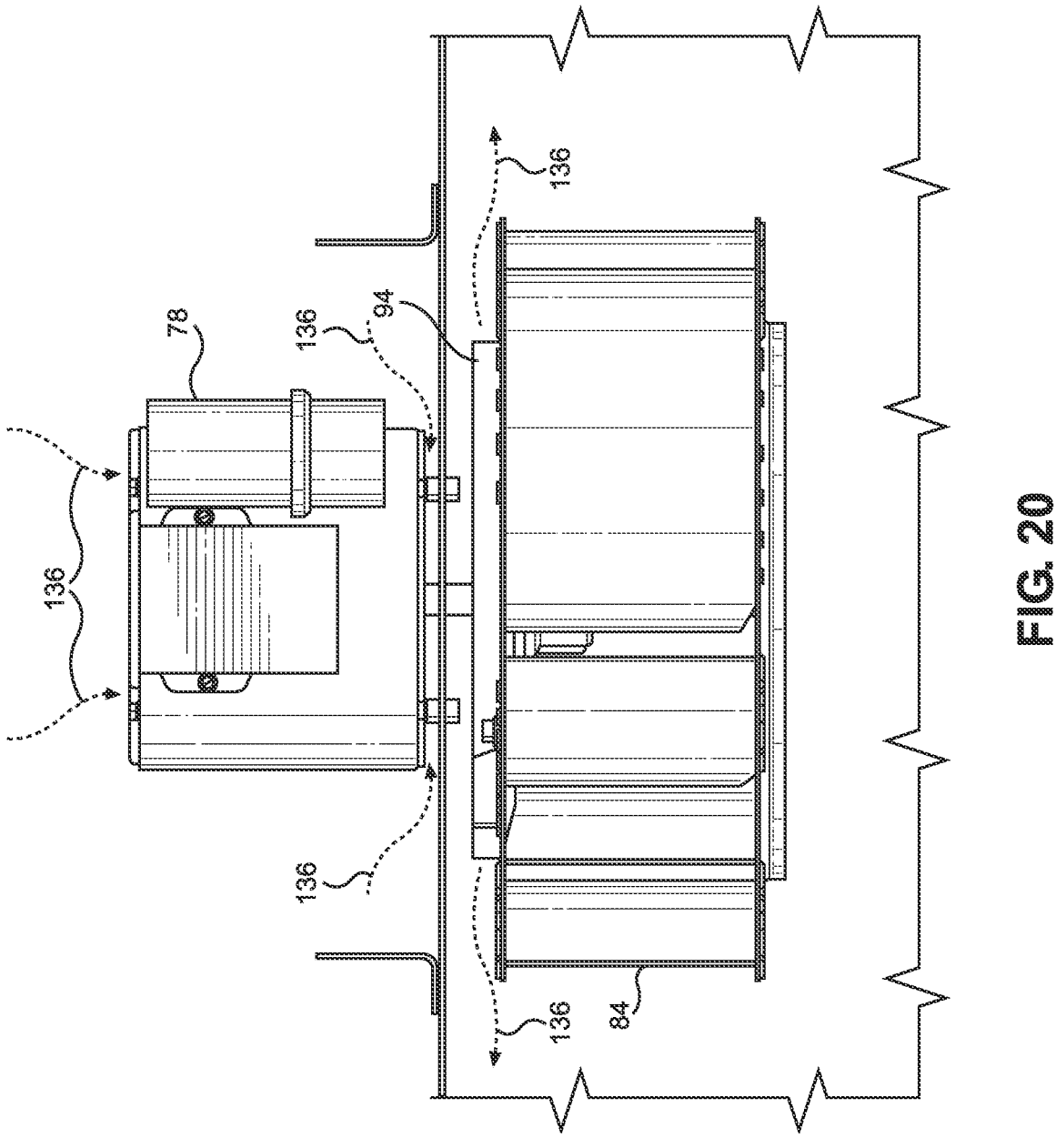
Figure 21:
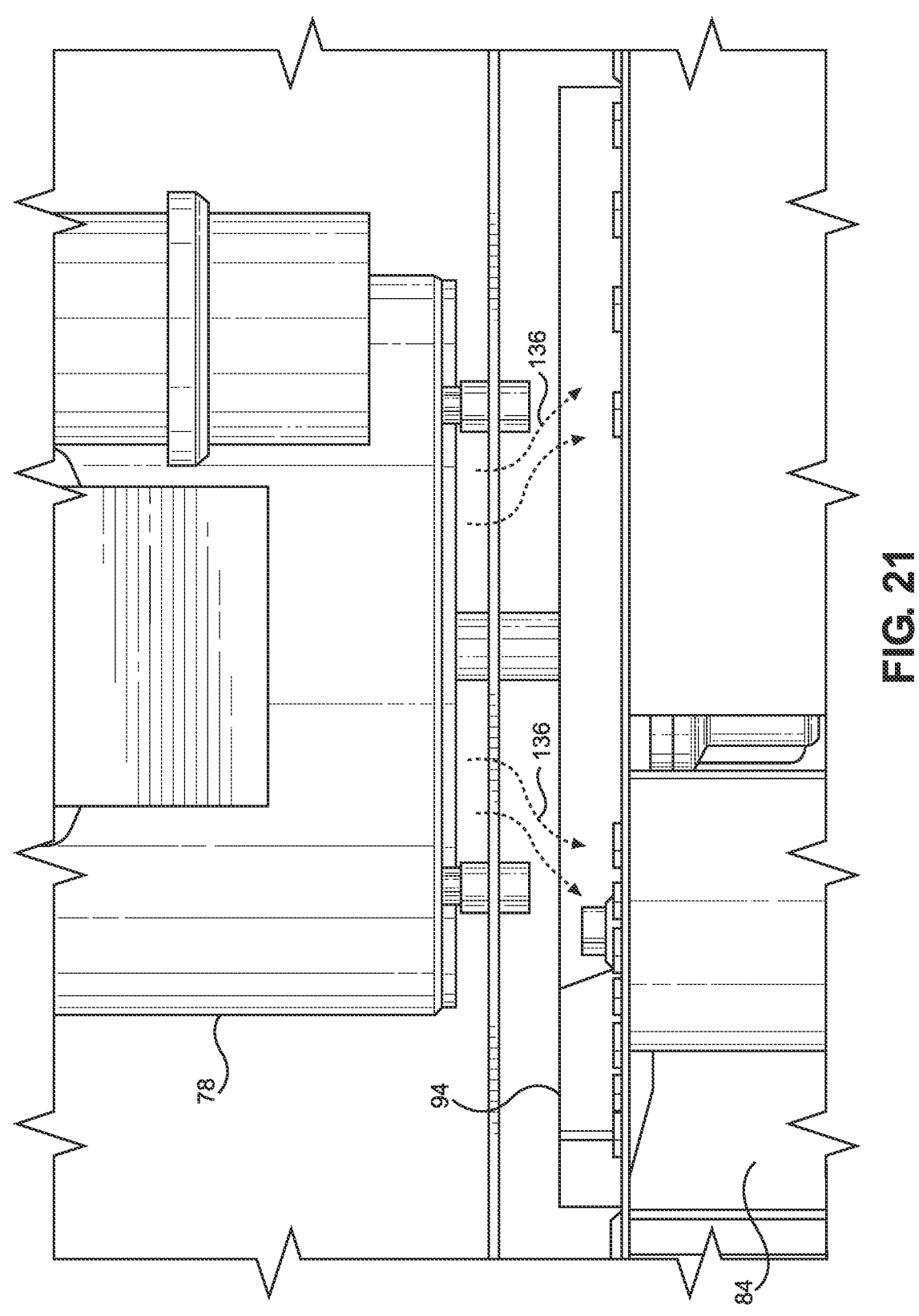

In one embodiment, as shown in FIGS. 16-17, the external filter 98 may include a mesh design with at least one wire mesh 104. In one embodiment, the external filter 98 include two wire meshes 105 and 106 have undulating pattern 108 and 110 (e.g., a smoothly rising and failing form or outline), respectively. The first and second wire meshes 105 and 106 may overlap one another in any suitable manner to adjust the filtering effects. In one embodiment, as shown in FIG. 16, the first and second wire meshes 105 and 106 are overlapping one another such that the undulating pattern 108 of the first wire mesh 105 is substantially perpendicular to the undulating pattern 110 of the second wire mesh 106. As may be appreciated, the external filter 98 may include more than or less than two sheets of wire meshes (e.g., one sheet, three sheets), and the wire meshes may overlap one another such that the undulating patterns are at any suitable angles relative to one another. The wire meshes 105 and 106 may be formed of any suitable sizes and patterns, for example, square and/or diamond, and the mesh size may be about 0.02 inches by 0.02 inches (about 0.05 cm by about 0.05 cm) to about 0.88 inches by about 0.88 inches (about 2.24 cm by about 2.24 cm). The wire meshes 104 and 106 may be made of any suitable material, for example, metals, metal alloys, polymers, textiles, etc.

The set of V-shaped louvers 102 are disposed within the frame body 100 and function to facilitate the transfer of the kitchen effluent towards the external filter 98 while prevent rain from penetrating the hood 18 from outside. A V-shaped angle 112 of the louvers 102 may be about 30 to about 120 degrees, about 30 to about 100 degrees, about 30 to about 90 degrees, about 40 to about 70 degrees, about 51 to about 60 degrees. The louvers 102 may be generally vertically attached to the back of the frame body 100 and may be formed of a single piece of material or a combination of pieces combined to form each louver 102. As rain hits the louvers 102, it is directed downward to water drains 114 disposed in a bottom portion of the frame track, preventing water from entering the two outlets 48 into the hood body 22. The distance 118 between the louvers 102 and/or the angle 120 of the louvers 102 may vary to effectively direct and prevent water from entering the vent duct (the exhaust exit 19), the motor 78, and the blower wheel 76. In one embodiment, the distance 118 may be about 6% to about 12% of a lateral dimension (the length) 121 of the frame body 100 may be about 1 inch to about 1.65 inches (about 2.54 cm to about 4.19 cm). In one embodiment, and the angle 120 may be about 51 degrees to about 60 degrees.

The louvers 102 may be attached to the rear side 21 of the hood body 22 via any suitable removably or non-removably mechanism for connecting the components, for example, via an adhesive, wedding, mechanical fastening, snap fit, interference fit, clearance fit, etc.

The hood 18 disclosed herein is designed to direct airflows in a manner to achieve a high hood efficiency. The kitchen effluent contains smoke, pollutants, grease, etc. and may have a high temperature. The specific design of the hood 18 ventilates the kitchen effluent in a manner such that the exhaust air discharged by the hood 18 is clean and with a significantly reduced temperature (e.g., the discharge air may be lower than 90° F.), which also benefits the hood 18 and especially the motor 78 to function more efficiently and greatly reduces the chance of motor overheating. The air/kitchen effluent flow through the various components of the hood 18 is discussed in FIGS. 18-21, demonstrating how their specific designs contribute to the high hood efficiency.

As indicated by arrows 130, the kitchen effluent is pulled into the hood 18. At this stage the kitchen effluent has a high temperature and high contents of smoke, pollutants, grease, etc. The hood 18 is configured to speed up the kitchen effluent (e.g., pulled by the blower assembly or the fan 44) such that kitchen effluent is pulled int the hood 18 with an airflow speed up to about 4000 feet per minute (FPM) (as opposed to about 500 FPM-2200 FPM accordingly to industry standard). When the kitchen effluent is sped up to such high speed, the grease in the effluent is extracted from the airflow. As the kitchen effluent enters the hood body 22, it is filtered by the baffle filters 38 to filter out a substantial portion of grease from the kitchen effluent. The grease remains on the side of the baffle filters 38 facing the inlet 36 of the hood 18. The grease is collected in the tray 40, which is easily removeable and cleaned. This allows clean ductwork and reduced maintenance.

As indicated by arrows 132, the filtered kitchen effluent then flows through the metal mesh 62 (configured to reduce the noise level) and the passage 64 (configured to straighten the airflow) of the inlet 46 and into the chamber 42. The inlet 46 and the blower wheel 76 may be substantially concentric along the axial axis 80 of the blower wheel 76, and the overlap between the passage 63 into the blower assembly 44 and the passage 64 of the inlet 46 may be up to one inch, to allow smooth airflow.

As indicated by arrows 134, the kitchen effluent, propelled by the rotating primary blades 84, is dispersed in the radial direction 92 of the blower wheel 76 and away from the motor 78. By dispersing the kitchen effluent away from the motor 78, it greatly reduces the extent of the grease and high-temperature airflow, coming into contact with the motor 78.

As indicated by arrows 136, the ambient air, pulled by the rotating secondary blades 94 also enters the chamber 42. Subsequently, the ambient air, propelled by the rotating primary blades 84, is also dispersed in the radial direction 92 of the blower wheel 76 and joins and mixes with the flow of the kitchen effluent (indicated by arrows 134).

It may be appreciated that since the ambient air (indicated by arrow 136) has a much lower temperature, the addition of which into the hood 18 can significantly reduce the overall temperature inside the hood 18. The ambient air allows the kitchen effluent temperature to be reduced to below 90° F. while the hood material is designed to withstand 1000° F. The reduction in air temperature inside the chamber 42 improves the efficiency of the blower assembly 44 by generating a venturi effect into the chamber 42. The flow of the ambient air through the opening 82 into the chamber 42 also provides convection and conduction cooling of the motor 78.

The pressure difference between the ambient pressure and the pressure inside the chamber 42 is induced by the blower assembly 44. This pressure difference is at least 0.25 Kilopascal (KPa).

As indicated by arrows 138, the combined airflow (including the kitchen effluent indicated by arrows 134 and the ambient air indicated by arrows 136) hits the turning vanes 66 which change the flow direction by about 90 degrees towards the two outlets 48. The turning vanes 66 are configured to create a smoother and more gradual change of direction and allow the airflow to pickup on flow velocity.

As indicated by arrows 140, the combined airflow is discharged from the hood 18 through the two outlets 48. The combined airflow flows through the baffle louvers 96 and then through the external filter 98 and exits the hood 18. The flow speed of the combined airflow is accelerated by the curves of the baffle louvers 96. The external filter 98 is configured to substantially filter out the remaining pollutants, grease, etc. The discharged air as indicated by arrows 140 is substantially clean and has a significantly lower temperature than that of the kitchen effluent entering the hood 18. The temperature of the discharged air may be as low as about 90° F.

In general, as the kitchen effluent and the ambient air enter the chamber 42, the flow direction changes by about 90 degrees as dispersed by the blower assembly 44, and the flow direction again changes by about 90 degrees as it exits the two outlets 48.

It should be appreciated that as the hood 18 is configured to synergistically remove and cool the kitchen effluent. The hood 18 is able to remove the kitchen effluent effectively and quickly owing to several factors. First, the presence of the turning vanes 66 and the baffle louvers 96 are configured to guide and accelerate the airflow. Second, the ambient air pulled in by the secondary blades 94 helps cooling the motor 78, thereby increases the efficiency of the blower assembly 44.

The presence of grease contributes significantly to the high temperature of the kitchen effluent. As the kitchen effluent is pulled quickly, owing to the high flow speed of the kitchen effluent, the grease is separated out from the kitchen effluent and filtered efficiently. This leads to fast elimination or at least fast reduction in the grease content (e.g., per cooling event the amount of the grease generated is not replenished). As the amount of grease is significantly reduced or eliminated, the temperature of the kitchen effluent also decreases. The addition of the ambient air of lower temperature also helps reduce the temperature of the kitchen effluent.

The faster flow speed leads to faster cooling, and the faster cooling leads to more efficient air pulling of the blower assembly 44. As such, the synergetic effects are achieved.

Table 1 shows suction capacities of the hood 18 with and without the turning vanes 66. The suction capacity is measured in cubic feet per minute (CFM). These results show that for kitchen affluent of the same temperature, the hood 18 with the turning vanes 66 demonstrates higher suction capacity to achieve the targeted grease capture and containment level. At 700° F. kitchen effluent temperature (e.g., the temperature measured near the inlet 36), the hood 18 without the turning vanes 66 pulls out greases at about 2482 CFM, whereas the hood 18 with the turning vanes 66 is able to pull out greases at a higher suction capacity of 2555 CFM. The suction capacity of the hood 18 is increased by about 2.9% due to the presence of the turning vanes 66. At 600° F. kitchen effluent temperature, the hood 18 without the turning vanes 66 pulls out greases at about 1683 CFM, whereas the hood 18 with the turning vanes 66 is able to pull out greases at a higher suction capacity of 1767 CFM. The suction capacity of the hood 18 is increased by about 4.9% due to the presence of the turning vanes 66. At 400° F. kitchen effluent temperature (e.g., the temperature measured near the inlet 36), the hood 18 without the turning vanes 66 pulls out greases at about 1295 CFM, whereas the hood 18 with the turning vanes 66 is able to pull out greases at a higher suction capacity of 1368 CFM. The suction capacity of the hood 18 is increased by about 5.6% due to the presence of the turning vanes 66. It should also be noted that in general it requires a higher suction capacity to pull greases out from kitchen effluent of a higher temperature.

TABLE 1

| | Exhaust CFM at which the targeted grease capture and containment is achieved |
| --- | --- |
| 700° F. with turning vanes | 2555 |
| 700° F. without turning vanes | 2482 |
| 600° F. with turning vanes | 1767 |
| 600° F. without turning vanes | 1683 |
| 400° F. with turning vanes | 1368 |
| 400° F. without turning vanes | 1295 |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:
1. A hood for use in a kitchen, the hood comprising:
a hood body comprising an inlet, a chamber, and two outlets, wherein the hood body is configured to function as a duct system to guide kitchen effluent to flow into the hood from the inlet, through the chamber, and out of the hood from the two outlets;
a blower assembly coupled to the hood body, comprising:
a motor; and
a blower wheel comprising:
primary blades configured to pull the kitchen effluent from the inlet into the chamber; and
secondary blades configured to pull an ambient air flowing through a rear side of the hood adjacent to the motor and into the chamber, wherein the blower assembly is configured to disperse the kitchen effluent and the ambient air radially outward in a direction perpendicular to a center axis of the blower wheel such that the kitchen effluent is expelled away from the motor.
2. The hood of claim 1, comprising turning vanes disposed in the chamber in a staggered manner to direct the kitchen effluent and the ambient air to exist the chamber from the two outlets.
3. The hood of claim 2, wherein the turning vanes have a curvature configured to gradually change flow directions and increase flow speed.
4. The hood of claim 3, wherein the curvature is about 100 degrees.
5. The hood of claim 2, wherein the turning vanes are disposed on a bottom side of the chamber.
6. The hood of claim 2, wherein a length of the turning vanes is about 70% of a height of the chamber.
7. The hood of claim 1 is configured to be mounted to a side wall of a food truck.
8. The hood of claim 1, comprising a metal mesh disposed at the inlet to reduce noise.
9. The hood of claim 1, comprising a circular curved ring disposed at the inlet to straighten a flow of the kitchen effluent into the chamber.
10. The hood of claim 1, comprising an external filter system disposed at the two outlets.
11. The hood of claim 10, wherein the external filter system comprises V-shaped louvers.
12. The hood of claim 10, wherein the external filter system comprises a first wire mesh and a second wire mesh that are overlapped one another such that an undulating pattern of the first wire mesh is substantially perpendicular to an undulating pattern of the second wire mesh.

13. The hood of claim 1 is configured to reduce a temperature of the kitchen effluent to about or below 90° F. when it exits the hood at the two outlets.

14. A mobile kitchen comprising a hood, wherein the hood comprising:

a hood body comprising an inlet, a chamber, and two outlets, wherein the hood body is configured to function as a duct system to guide kitchen effluent to flow into the hood from the inlet, through the chamber, and out of the hood from the two outlets;

a blower assembly coupled to the hood body, comprising:

a motor; and a blower wheel comprising:

primary blades configured to pull the kitchen effluent from the inlet into the chamber; and secondary blades configured to pull an ambient air flowing through a rear side of the hood adjacent to the motor and into the chamber, wherein the blower assembly is configured to disperse the kitchen effluent and the ambient air radially outward in a direction perpendicular to a center axis of the blower wheel such that the kitchen effluent is expelled away from the motor.

15. The mobile kitchen of claim 14, comprising turning vanes disposed in the chamber in a staggered manner to direct the kitchen effluent and the ambient air to exist the chamber from the two outlets.

16. The mobile kitchen of claim 15, wherein the turning vanes have a curvature configured to gradually change flow directions and increase flow speed.

17. The mobile kitchen of claim 16, wherein the curvature is about 100 degrees.

18. The mobile kitchen of claim 15, wherein the turning vanes are disposed on a bottom side of the chamber.

19. The mobile kitchen of claim 15, wherein a length of the turning vanes is about 70% of a height of the chamber.

20. The mobile kitchen of claim 14 is configured to be mounted to a side wall of a food truck.

\* \* \* \* \*